United States Patent
Saha

(10) Patent No.: US 12,218,572 B2
(45) Date of Patent: Feb. 4, 2025

(54) ZERO CURRENT DETECTION AND PROTECTION FOR DCM BOOST CONVERTER

(71) Applicant: TEXAS INSTRUMENTS INCORPORATED, Dallas, TX (US)

(72) Inventor: Aalok Dyuti Saha, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 363 days.

(21) Appl. No.: 17/858,222

(22) Filed: Jul. 6, 2022

(65) Prior Publication Data
US 2023/0008179 A1 Jan. 12, 2023

(30) Foreign Application Priority Data
Jul. 6, 2021 (IN) .............................. 202141030319

(51) Int. Cl.
*H02M 1/00* (2007.01)
*H02M 3/158* (2006.01)

(52) U.S. Cl.
CPC ......... *H02M 1/0009* (2021.05); *H02M 3/158* (2013.01); *H02M 3/1582* (2013.01)

(58) Field of Classification Search
CPC ... H02M 1/0009; H02M 3/158; H02M 3/1582
See application file for complete search history.

(56) References Cited

U.S. PATENT DOCUMENTS

| | | | |
|---|---|---|---|
| 2015/0177754 A1* | 6/2015 | Mengad | G05F 1/575 323/280 |
| 2022/0149736 A1* | 5/2022 | Warnes | H02M 3/156 |

* cited by examiner

*Primary Examiner* — Jue Zhang
*Assistant Examiner* — Lakaisha Jackson
(74) *Attorney, Agent, or Firm* — Charles F. Koch; Frank D. Cimino

(57) ABSTRACT

In an example, a system includes a differential amplifier having a first input terminal and a second input terminal, the differential amplifier configured to be coupled to a boost diode of a boost converter. The system also includes an input diode coupled to the first input terminal and the second input terminal. The system includes a pull-up circuit coupled to the input diode and configured to be coupled to the boost diode. The system also includes a pull-down circuit coupled to the pull-up circuit. The system includes a transistor coupled to the pull-up circuit and the pull-down circuit.

20 Claims, 7 Drawing Sheets

2

ZERO CURRENT DETECTION AND PROTECTION FOR DCM BOOST CONVERTER

CROSS-REFERENCE TO RELATED APPLICATIONS

This application claims priority to Indian Provisional Patent Application No. 202141030319, which was filed Jul. 6, 2021, is titled "Low IQ, EMI Compliant, High Voltage Zero Current Detection And Protection Scheme For A DCM Boost," and is hereby incorporated herein by reference in its entirety.

BACKGROUND

A boost converter is a direct current (DC)—to—DC power converter that steps up voltage from its input to its output. Some boost converters can operate in discontinuous conduction mode (DCM). In DCM, the switching circuitry of the boost converter switches off long enough for the current through the inductor to reach zero. This causes a diode and a field effect transistor (FET) in the boost converter to both be turned off. In DCM operation, a zero current detector (ZCD) detects whether the current through the diode reaches zero in order to turn the switching circuitry on again.

SUMMARY

In at least one example of the description, a system includes a differential amplifier having a first input terminal and a second input terminal, the differential amplifier configured to be coupled to a boost diode of a boost converter. The system also includes an input diode coupled to the first input terminal and the second input terminal. The system includes a pull-up circuit coupled to the input diode and configured to be coupled to the boost diode. The system also includes a pull-down circuit coupled to the pull-up circuit. The system includes a transistor coupled to the pull-up circuit and the pull-down circuit.

In at least one example of the description, a system includes a boost converter including a boost inductor, a boost diode, and a boost switch, where the boost converter is configured to receive an input voltage and provide a boosted output voltage. The system also includes a differential amplifier having a first input terminal and a second input terminal, the differential amplifier coupled to the boost diode and configured to determine a voltage difference. The system includes an input diode coupled to the first input terminal and the second input terminal, the input diode configured to provide the voltage difference between the first input terminal and the second input terminal. The system also includes a transistor coupled to the input diode, the transistor configured to isolate the differential amplifier from the boost switch.

In at least one example of the description, a system includes a boost converter including a boost inductor, a boost diode, and a boost switch. The boost converter also includes a differential amplifier having a first input terminal and a second input terminal, the differential amplifier coupled to the boost diode. The boost converter includes an input diode coupled to the first input terminal and the second input terminal. The boost converter also includes a pull-up circuit coupled to the input diode. The boost converter includes a pull-down circuit coupled to the pull-up circuit. The boost converter also includes a transistor coupled to the pull-up circuit and the pull-down circuit.

DETAILED DESCRIPTION

Figure 1:
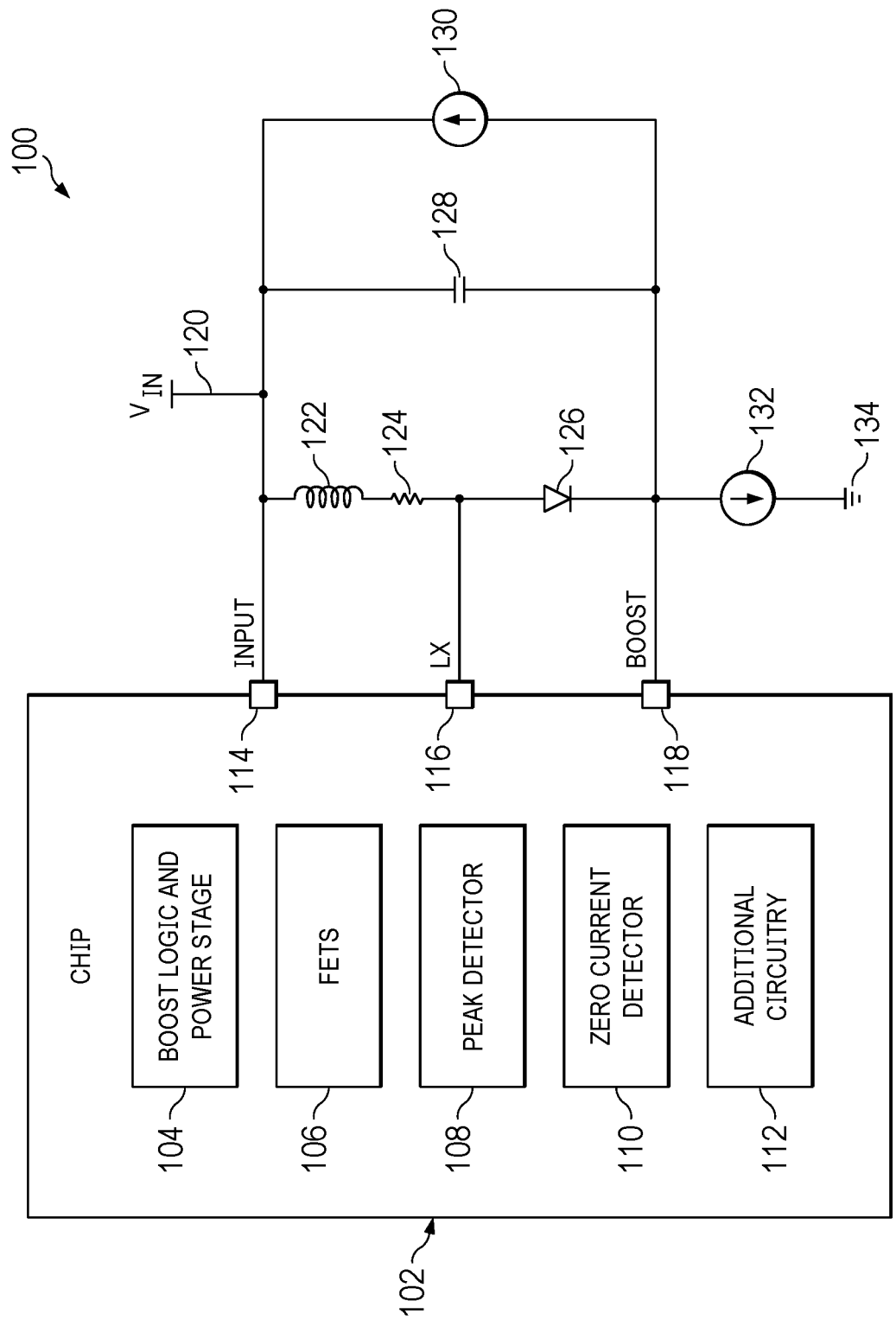
FIG. 1 is a diagram of a system for zero current detection and protection for a DCM boost converter in various examples.

A boost converter receives an input voltage and produces a higher voltage at its output. Boost converters may include boost inductors (L), boost switches (which may be a FET or another transistor), and diodes. An output capacitance (C) may be coupled across the load. In some boost converters, a sense FET is coupled to a switching FET to sense the current through the switching FET. A peak detector detects a peak current in the boost converter, and a ZCD detects whether the level of the current through the diode and/or the inductor reaches zero. Boost converters can achieve high efficiency by operating in DCM. During DCM, the current in the inductor in the boost converter goes to zero during part of the switching cycle. Both detectors may provide feedback to a controller or other logic, which operates the boost converter based on the feedback.

In operation, after the boost switch is turned on, the current in the boost inductor rises to charge the boost inductor. After the current reaches a peak value, the boost switch is turned off and the boost inductor discharges the current through the boost diode to the output capacitor. The discharging of this inductor current produces an output voltage that is higher than the input voltage. As the inductor current falls, the boost converter detects that the inductor current reaches zero. After the inductor current reaches zero, the boost switch is turned on again, and the current through the boost inductor begins to rise again. This cycle is repeated to deliver power to the load. To perform these steps, the time at which the current through the diode reaches zero should be detected.

In some systems, if the diode is conducting, a node coupled to the diode and the inductor has a voltage equal to the boost voltage plus a diode forward voltage. This node is referred to herein as LX or the LX node. If the diode current reaches zero, the voltage V_LX at LX may drop to a value equal to the input voltage. This voltage drop at LX may cause ringing at the node. In some examples, LX is a pin on a chip that connects to the boost inductor, which is external to the chip. The pin has a parasitic capacitance that, coupled with the boost inductor and a reverse diode recovery current, can cause LC ringing at LX. Ringing can lead to a loss of energy and even electromagnetic interference (EMI).

Also, in some boost converters, the ZCD has a differential amplifier structure with a common gate, cascode transistors, and other circuitry. The output of the differential amplifier is provided to the boost logic to turn on and off the boost switch. However, with this structure, the voltage across the differential amplifier could increase while the boost inductor is charging. This voltage could reach voltages higher than the supply voltage in some examples, such as a voltage near the boost output voltage. This high voltage could damage the circuit components.

In examples herein, additional circuitry is provided to a boost converter architecture to both reduce or prevent ringing at LX and reduce or prevent the voltage increase across the differential amplifier. First, a laterally-diffused metal-oxide semiconductor (LDMOS) body diode is useful as the diode in some examples (which may be referred to herein as a boost diode). In other examples, other suitable diodes may be useful. Second, the additional circuitry includes a second diode, which is coupled to the input terminals of the differential amplifier. Third, the additional circuitry includes a transistor (in one example, a metal-oxide semiconductor field effect transistor (MOSFET)), which is coupled to pull-up circuitry and pull-down circuitry. The pull-up and pull-down circuitry may be controlled in part by the boost logic that turns on and off the boost switch in the boost converter. This additional circuitry performs a number of functions. The transistor prevents the voltage jumps at LX, which reduces or eliminates LC ringing. The transistor may be sized so the voltage drop across the transistor creates an intentional offset, such that a comparator threshold triggers just before the inductor current reaches zero. This design helps to prevent the sudden voltage jump at LX. The transistor and the second diode reduce the voltage increase across the differential amplifier by isolating LX from the input terminals of the differential amplifier, which protects the circuit components. The pull-up and pull-down circuitry ensures a fast turn-on time for the transistor. Also, the additional quiescent current consumed by the additional circuitry is low, which allows these examples to be useful for low-power, always-on applications, such as automotive applications.

FIG. 1 is a diagram of a system 100 for zero current detection and protection for a DCM boost converter in various examples herein. The same reference numbers or other reference designators are used in the drawings to designate the same or similar (functionally and/or structurally) features. System 100 includes a chip 102. In this example, some of the components of a boost converter are embodied in a package such as chip 102. Other components are located outside of chip 102. In other examples, additional or fewer features may be incorporated into chip 102. Also, some or all of the features shown as being external to chip 102 may be included in chip 102 and/or some features shown as being internal to chip 102 may be incorporated outside of chip 102.

In this example, chip 102 includes Boost Logic and Power Stage 104, FETs 106, peak detector 108, zero current detector (ZCD) 110, and additional circuitry 112. These components are merely examples of components or circuitry that may be embodied in chip 102, and other components may be included in other examples. Chip 102 also includes a number of pins or leads. In this example, pins 114, 116, and 118 are shown. Pin 114 is the Input pin that receives an input voltage from a voltage source $V_{IN}$ 120. Pin 116 is the LX pin, which is coupled to an LX node as described herein. Pin 116 is also referred to as LX node 116 in examples herein. Pin 118 is the BOOST pin, which provide the boost voltage $V_{BOOST}$ produced by the boost converter to a load and/or additional circuitry. Pin 118 is also referred to as BOOST node 118 in examples herein System 100 also includes a boost inductor 122. Boost inductor 122 may include a DC resistance, shown as resistance 124. System 100 includes boost diode 126. In some examples, boost diode 126 may reside inside chip 102. System 100 includes an output capacitance 128 across a load 130, and may also include another load 132. System 100 also includes ground 134.

In operation, a boost converter receives an input voltage (such as a voltage $V_{IN}$ from voltage source $V_{IN}$ 120), and produces an output voltage (such as $V_{BOOST}$). Here, some of the components of the boost converter are embodied in a chip 102. The boost inductor 122, boost diode 126, output capacitance 128, and loads 130 and 132 are external to chip 102 in this example. Boost Logic and Power Stage 104 includes any suitable circuitry, logic, controller, or other components to manage the operation of the boost converter. As one example, Boost Logic and Power Stage 104 switches FETs 106 on and off to produce $V_{BOOST}$. Peak detector 108 and ZCD 110 provide feedback regarding the operation of the boost converter to Boost Logic and Power Stage 104, and Boost Logic and Power Stage 104 receives the feedback and switches FETs 106 to produce a specific $V_{BOOST}$. In this example, additional circuitry 112 is configured to prevent ringing at pin 116 (e.g., the LX node) and prevent the voltage increase across the differential amplifier, which may be a component of ZCD 110. The detailed operation of additional circuitry 112 and other components is described below.

Figure 2:
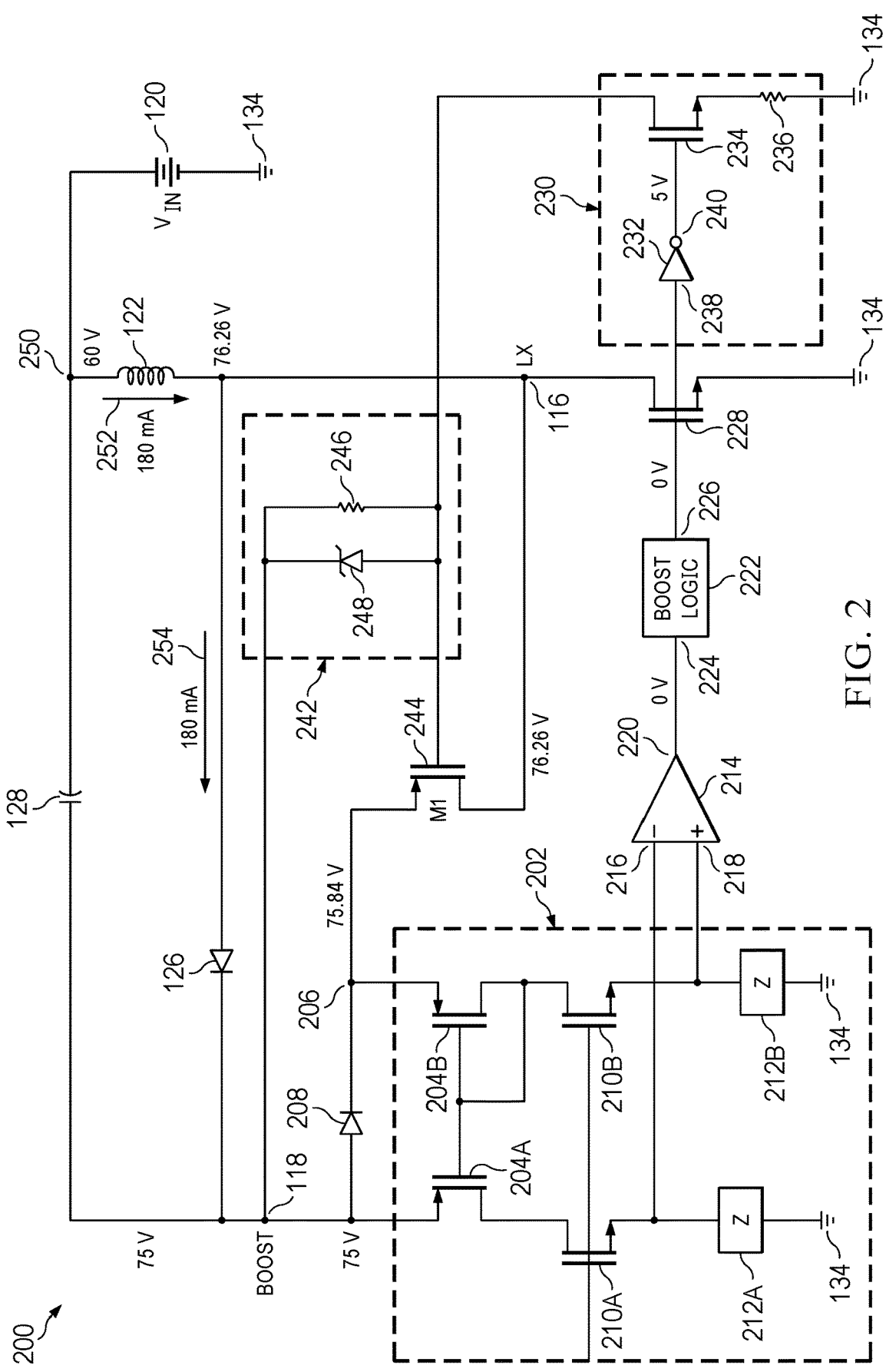
FIG. 2 is a circuit diagram of a system for zero current detection and protection for a DCM boost converter in various examples.

FIG. 2 is a circuit diagram of a system 200 for zero current detection and protection for a DCM boost converter in various examples herein. In system 200, some of the components are described above with respect to FIG. 1, and like numerals denote like components. Not all of the components of a boost converter are shown in system 200. In some other examples, some of the components of system 200 may be absent. Some components in system 200 may be located in a package such as chip 102 (not shown in FIG. 2). Some components in system 200 may be located outside of a package such as chip 102.

System 200 includes LX node 116, BOOST node 118, voltage source $V_{IN}$ 120, boost inductor 122, boost diode 126, and output capacitance 128. System 200 also includes a differential amplifier 202. Differential amplifier 202 is one example of a differential amplifier structure, but other examples may have different architectures for the differential amplifier 202. Differential amplifier 202 includes transistors 204A and 204B. Transistors 204A and 204B are FETs in this example, but any suitable transistors are useful in other examples. Transistor 204A has a source coupled to BOOST node 118 and a gate coupled to the gate of transistor 204B. Transistor 204B has a source coupled to node 206. Input diode 208 is coupled between BOOST node 118 and node 206. BOOST node 118 and node 206 are the input terminals for differential amplifier 202. For example, BOOST node 118 may be a first input terminal and node 206 may be a second input terminal.

Differential amplifier 202 also includes cascode transistors 210A and 210B. Cascode transistors 210A and 210B are FETs in this example, but any suitable transistors are useful in other examples. A drain of cascode transistor 210A is coupled to a drain of transistor 204A. A gate of cascode transistor 210A is coupled to a gate of cascode transistor 210B. A drain of cascode transistor 210B is coupled to a drain of transistor 204B. A source of cascode transistor 210A is coupled to a load 212A, labeled Z in FIG. 2. A source of cascode transistor 210B is coupled to a load 212B, labeled Z in FIG. 2. Loads 212A and 212B may be resistors, current mirrors, or other load source in some examples.

Differential amplifier 202 provides a differential input voltage to comparator 214. Comparator 214 has a first comparator input 216 and a second comparator input 218. Comparator 214 has a comparator output 220. Comparator output 220 is coupled to boost logic 222. Boost logic 222 may be a component of Boost Logic and Power Stage 104 shown in FIG. 1. Boost logic 222 has an input 224 and an output 226. Output 226 is coupled to boost switch 228. In this example, boost switch 228 is an n-channel FET ("NFET"), but other types of transistors or switches are useful in other examples. Boost switch 228 has a gate coupled to output 226, a source coupled to ground 134, and a drain coupled to the LX node, which is pin 116 or LX node 116 in FIG. 1. The operation of differential amplifier 202, boost logic 222, and boost switch 228 is described below.

Output 226 is also coupled to pull-down circuitry 230. In this example, pull-down circuitry includes an inverter 232, a transistor 234, and a resistor 236. In other examples, any suitable pull-down circuitry may be useful. Inverter 232 has an inverter input 238 and an inverter output 240. Inverter input 238 is coupled to output 226, and inverter output 240 is coupled to the gate of transistor 234. Transistor 234 is a FET in this example, but another type of transistor may be useful in other examples. A source of transistor 234 is coupled to resistor 236, and resistor 236 is coupled to ground. A drain of transistor 234 is coupled to pull-up circuitry 242 and transistor M1 244.

Pull-up circuitry 242 includes a resistor 246 and a Zener diode 248. Zener diode 248 is coupled in parallel to resistor 246. Both resistor 246 and Zener diode 248 are coupled to a gate of transistor M1 244. A drain of transistor M1 244 is coupled to LX node 116. A source of transistor M1 244 is coupled to node 206 and to input diode 208.

In this example, the additional circuitry 112 from FIG. 1 may be input diode 208, inverter 232, transistor 234, resistor 236, transistor M1 244, resistor 246, and Zener diode 248. Without this additional circuitry 112, a boost converter may experience ringing at LX node 116 and may experience a large voltage increase across the differential amplifier 202. With additional circuitry 112, however, these issues may be reduced or eliminated.

Figure 3:
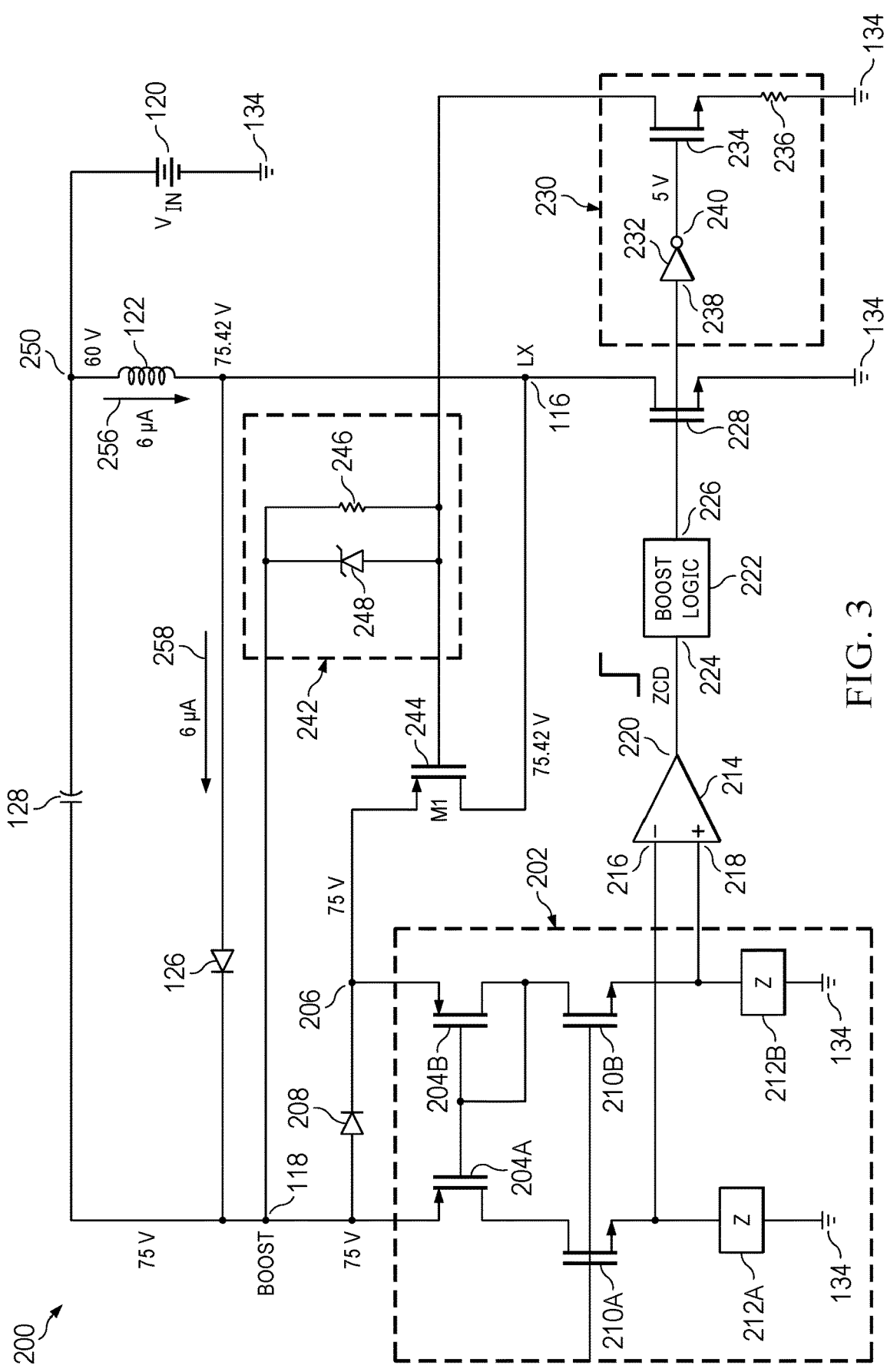
FIG. 3 is circuit diagram of a system for zero current detection and protection for a DCM boost converter in various examples.
Figure 4:
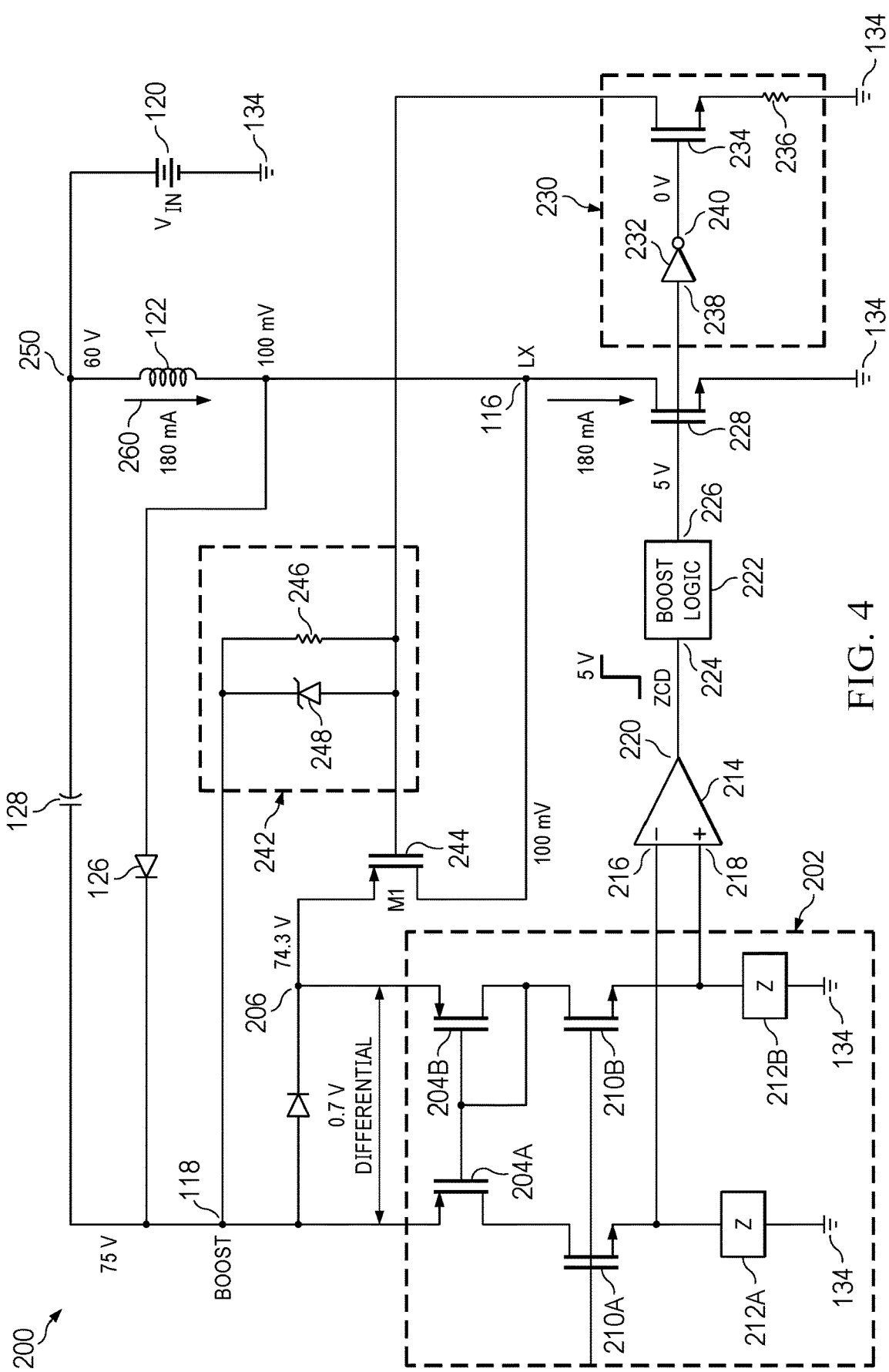
FIG. 4 is circuit diagram of a system for zero current detection and protection for a DCM boost converter in various examples.

FIG. 2 includes voltages and currents in the circuit during a first operating phase in one example herein. FIGS. 3 and 4 show the voltages and currents in the circuit during later operating phases. In the first phase shown in FIG. 2, a number of voltages and current are labeled in the drawing. These voltages and currents are example values based on example sizes of components in system 200. In other examples, different sizes of transistors, resistors, inductors, diodes, and other components may be useful. In those other examples, the voltage and current values may differ from the values shown here. However, the principles of operation described here apply to those other examples.

A voltage source $V_{IN}$ 120 provides an input voltage of 60 V at a node 250. In one example, node 250 may be pin 114 in FIG. 1. Voltage source $V_{IN}$ 120 may also provide operating voltages of various values to circuit components in system 200 via other power supply circuitry (not shown in FIG. 2). The circuit components in system 200 are designed to produce a boost voltage $V_{BOOST}$ of approximately 75 V at BOOST node 118.

In this first phase, the boost inductor 122 has already been charged and is now discharging through boost diode 126. Therefore, current 252 (the inductor current) is a 180 milliamps (mA) current in this example. The boost switch 228 is off at this time, because boost logic 222 has 0 V at its input 224 and 0 V at its output 226. The voltage of 0 V at output 226 turns off boost switch 228. Inverter 232 receives a 0 V input at its inverter input 238, and therefore produces an output of 5 V at inverter output 240. A 5 V signal at inverter output 240 turns on transistor 234. If transistor 234 is on, current flows through resistor 246. Therefore, a voltage drop exists across resistor 246 and across Zener diode 248. This voltage drop creates a positive source-to-gate voltage across transistor M1 244 of about 5 V, which turns transistor M1 244 on. Therefore, if transistor 234 is on, transistor M1 244 is also on.

As shown, in this phase a current 254 of about 180 mA flows through boost diode 126 from the discharging of boost inductor 122. The voltage at LX node 116 is 76.26 V as shown in this example. The nominal forward voltage of boost diode 126 is selected to be about 1.26 V during this phase, which produces the voltage of 76.26 V at LX node 116.

In this example, transistor M1 244 is designed to have a source to drain voltage drop of about 420 mV if turned on. Therefore, node 206 has a voltage of 75.84 V during this phase, which is slightly higher than the 75 V at BOOST node 118. Because the voltage at node 206 is higher than BOOST node 118, the zero current condition is not detected by comparator 214. If transistor M1 244 was absent, node 206 would instead have a voltage equal to the voltage at LX node 116, or 76.26 V.

Accordingly, during the phase where boost inductor 122 is discharging, a current 252 of 180 mA begins to flow through boost inductor 122, and a current 254 of 180 mA begins to flow through boost diode 126. Currents 252 and 254 reduce as boost inductor 122 discharges. The boost voltage $V_{BOOST}$ at BOOST node 118 is 75 V, the voltage at LX node 116 is 76.26 V, and the voltage at node 206 is 75.84 V. Comparator 214 does not detect a zero current condition, and therefore boost switch 228 is off. Transistor 234 and transistor M1 244 are both on.

FIG. 3 is a circuit diagram of a system 200 for zero current detection and protection for a DCM boost converter in various examples herein. The description of the components in FIG. 3 is provided with respect to FIG. 2 above. FIG. 3 includes voltages and currents in the circuit during a second operating phase in one example herein. These voltages and currents are example values based on example sizes of components in system 200. In other examples, the voltage and current values may differ from the values shown here.

During the second phase shown in FIG. 3, the inductor current 256 has discharged. In this example, inductor current 256 is 6 microamps (μA). Current 258 through boost diode 126 is also 6 μA at this time. If 6 μA flows through boost diode 126, the forward voltage drop across the boost diode 126 is approximately 420 mV for this example boost diode 126. The voltage at LX node 116 is 75.42 V at this time. The voltage at the drain of transistor M1 244 is also 75.42 V. The voltage drop of transistor M1 244 is designed to be approximately 420 mV to match boost diode 126 in this example. Therefore, the voltage at node 206 is 75 V. At this time the voltage at node 206 is 75 V and the voltage at BOOST node 118 is also 75 V. Therefore, the differential amplifier 202 will detect that the difference in the voltages at these two nodes is zero. The comparator 214 will not detect zero current until the voltage at node 206 drops below the voltage at BOOST node 118. The voltage at node 206 drops below 75 V if inductor current 256 drops below 6 µA in this example. Therefore, with the values of the circuit components selected in this example, comparator 214 trips if the current goes below 6 µA, rather than below 0 A.

Comparator 214 trips before the current 258 through boost diode 126 goes to zero. If current 258 goes to zero, the voltage at LX node 116 drops to 60 V (the same as the voltage from voltage source $V_{IN}$ 120). The voltage at LX node 116 drops to 60 V because zero current is flowing through boost inductor 122 at this time. If LX node 116 drops to 60 V, the sharp drop from 75.42 V to 60 V causes ringing at the node as described above. The additional circuitry 112 prevents this large drop as described herein.

The additional circuitry 112 prevents current 258 through boost diode 126 from going completely to zero, which prevents the sharp voltage drop at LX node 116 that causes ringing. In this example, current 258 drops to a small, negligible current of about 6 µA. In other examples, that current could be a different small value. The value of 6 µA for current 258 is negligible compared to the value of 180 mA for current 254 through boost diode 126 in the first phase described above with respect to FIG. 2. Therefore, the boost converter has little to no loss of efficiency.

FIG. 4 is a circuit diagram of a system 200 for zero current detection and protection for a DCM boost converter in various examples herein. The description of the components in FIG. 4 is provided with respect to FIG. 2 above. FIG. 4 includes voltages and currents in the circuit during a third operating phase in one example herein. These voltages and currents are example values based on example sizes of components in system 200. In other examples, the voltage and current values may differ from the values shown here.

The third phase in FIG. 4 provides an example of how the high-voltage differential between the input terminals of differential amplifier 202 is prevented. During the third phase shown in FIG. 4, the current through boost diode 126 has dropped below 6 µA, which reduces the voltage at node 206 to 74.3 V. Because the voltage at BOOST node 118 is 75 V, a voltage differential exists between the input terminals of differential amplifier 202. This voltage differential triggers comparator 214. As shown, the voltage at comparator output 220 rises from 0 to 5 V after comparator 214 is triggered. Boost logic 222 receives the 5 V signal and produces 5 V at its output 226. The 5 V output is provided to the gate of boost switch 228, which turns on boost switch 228. Inverter 232 produces a voltage of 0 V at inverter output 240, which turns off transistor 234.

Turning off transistor 234 also turns off transistor M1 244. Due to the design of pull-down circuitry 230 and pull-up circuitry 242, transistor M1 244 turns on and off faster than boost switch 228 turns on. Therefore, transistor M1 244 is able to turn on and off faster than the voltage at LX node 116 can go to a high voltage or to zero voltage.

As described above, if comparator 214 triggers, boost switch 228 turns on. However, before boost switch 228 turns on, transistor M1 244 turns off because it is faster than boost switch 228 as described above. After transistor M1 244 turns off, LX node 116 is isolated from node 206. After boost switch 228 turns on, LX node 116 is pulled to a value near ground, such as 100 mV as shown. Due to the isolation created by transistor M1 244, node 206 is not pulled to 100 mV along with LX node 116. Rather, node 206 is at a voltage of the $V_{BOOST}$ voltage at BOOST node 118 (e.g., 75 V) minus a diode voltage drop (e.g., 0.7 V) from input diode 208. Therefore, node 206 is at 74.3 V. Rather than a 75 V differential across differential amplifier 202 that would occur without transistor M1 244, the differential is only 0.7 V. This differential voltage is high enough to trigger comparator 214 and turn on boost switch 228.

As described above, transistor M1 244 is able to turn on and off faster than boost switch 228 due to pull-up circuitry 242 and pull-down circuitry 230. In this example, resistor 246 may be about 30 kiloohms (kΩ). Resistor 236 may be about 6.6 kΩ These resistor values may vary in other examples.

The additional circuitry 112 described herein not only reduces ringing at LX node 116 and prevents a large voltage across differential amplifier 202, it also adds only a small additional amount of quiescent current to the boost converter. The pull-down current through transistor 234 and resistor 236 is only about 600 µA. However, the additional circuitry 112 is only on if boost switch 228 is off. In one example, the circuitry described herein is on for about 54 microseconds of each 312-millisecond cycle. During this 54 microsecond cycle, if the duty cycle is 50%, boost switch 228 is on for 27 microseconds and transistor 234 is on for 27 microseconds. Therefore, the average additional current from the additional circuitry 112 is only about 52 nanoamps (nA) (600 µA times 27 microseconds/312 milliseconds). This additional quiescent current is less than a 100 nA current requirement for low-power, always-on devices, such as automotive applications.

Figure 5:
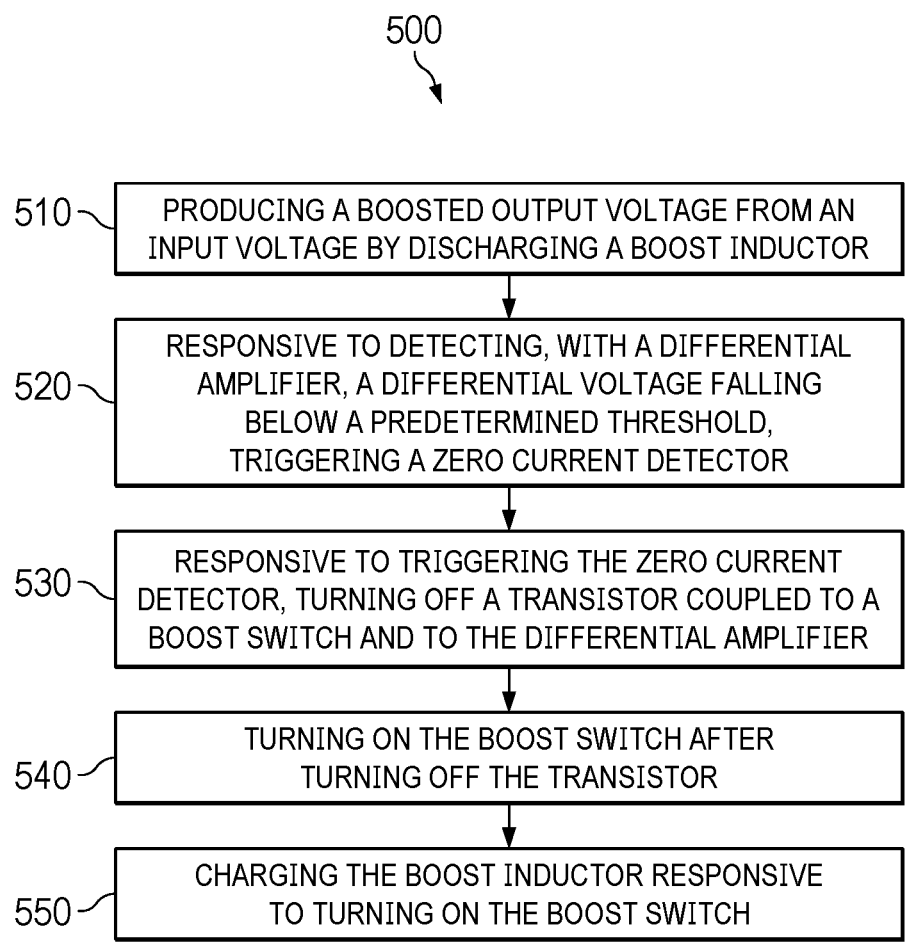
FIG. 5 is flow diagram of a method for zero current detection and protection for a DCM boost converter in various examples.

FIG. 5 is a flow diagram of a method 500 for zero current detection and protection for a DCM boost converter in various examples herein. The steps of method 500 may be performed in any suitable order. The hardware components described herein with respect to FIG. 1-4 or 6-7 may perform method 500 in some examples. Any suitable hardware or digital logic may perform method 500 in some examples.

Method 500 begins at 510, where the boost converter produces a boosted output voltage from an input voltage by discharging a boost inductor 122. As described above, a boost inductor 122 is charged and then discharges through boost diode 126. A boosted voltage $V_{BOOST}$ is produced at BOOST node 118, which is higher than the input voltage from voltage source $V_{IN}$ 120.

Method 500 continues at 520, where a differential amplifier 202 detects a differential voltage falling below a predetermined threshold, which triggers comparator 214. As described above with respect to FIG. 4, the voltage at node 206 drops below the voltage at BOOST node 118. This voltage difference is detected by the differential amplifier 202, which triggers the comparator 214. The voltage at comparator output 220 goes high if comparator 214 is triggered.

Method 500 continues at 530, where, responsive to triggering comparator 214, a transistor M1 244 coupled to a boost switch 228 and to the differential amplifier 202 turns off. In the example described herein, transistor M1 244 turns off. Transistor M1 244 is coupled to boost switch 228 through LX node 116 and also coupled to differential amplifier 202 via node 206. As described above, a high voltage output from boost logic 222 is provided to inverter input 238. Inverter 232 provides a zero voltage at its inverter output 240. This zero voltage turns off transistor 234, and also turns off transistor 244. Turning off transistor M1 244 isolates LX node 116 from node 206.

Method 500 continues at 540, where, after turning off the transistor M1 244, the boost switch 228 is turned on. Boost switch 228 is a FET in this example, and boost switch 228 turns on responsive to the voltage of 5 V provided at its gate terminal by boost logic 222. After boost switch 228 turns on, current begins to flow from voltage source $V_{IN}$ 120, through boost inductor 122, and through boost switch 228. As described above, transistor M1 244 and other circuit components in this examples are designed so transistor M1 244 turns on and off faster than boost switch 228. Therefore, transistor M1 244 turns off before boost switch 228 turns on. This disconnects LX node 116 from node 206, which is one of the inputs of differential amplifier 202. After boost switch 228 turns on, LX node 116 is pulled to a low voltage value or near ground due to current flowing through boost switch 228. If LX node 116 were still coupled to node 206 through transistor M1 244, the voltage at node 206 would also be low. This low voltage would create a large voltage differential across the inputs of differential amplifier 202 (e.g., node 206 and BOOST node 118). This large voltage differential could damage circuit components. By turning off transistor M1 244 before boost switch 228 turns on, the large differential voltage is prevented.

Method 500 continues at 550, where the circuit charges the boost inductor 122 responsive to turning on the boost switch 228. Current flows from voltage source $V_{IN}$ 120, through boost inductor 122, and through boost switch 228 to charge boost inductor 122. Charging boost inductor 122 produces a boosted output voltage $V_{BOOST}$, and the cycle described herein may continue.

Figure 6:
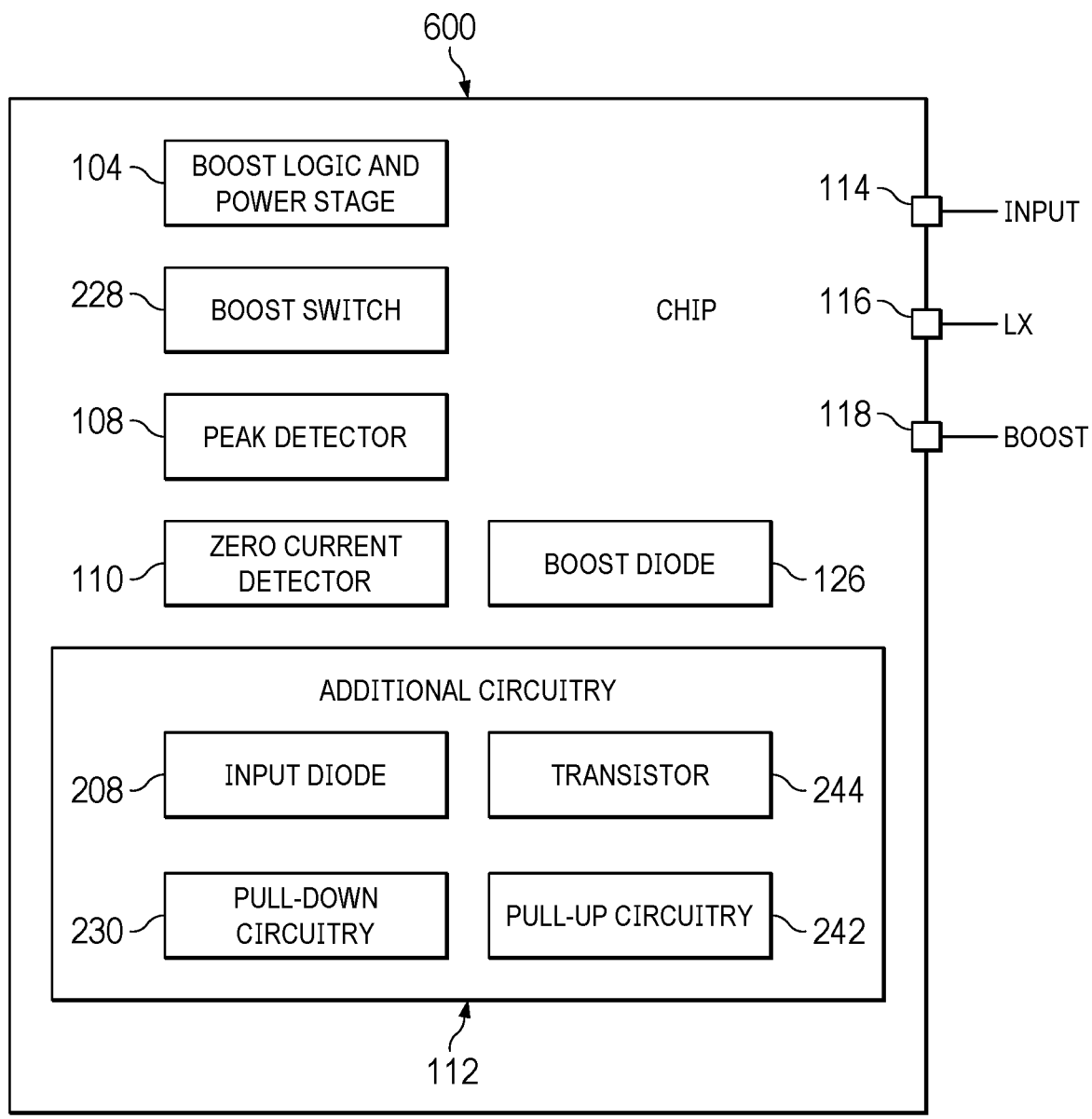
FIG. 6 is a block diagram of an integrated circuit ("chip") for zero current detection and protection for a DCM boost converter in various examples.

FIG. 6 is a block diagram of an integrated circuit ("chip") 600 for zero current detection and protection for a DCM boost converter in various examples herein. In this example, the components of FIG. 6 are located inside chip 600. In other examples, some components may be located outside of chip 600. In chip 600, some of the components are described above with respect to FIGS. 1 and 2, and like numerals denote like components.

Chip 600 also includes Boost Logic and Power Stage 104, boost diode 126, a boost switch 228, a peak detector 108, and ZCD 110. The operation of these components is described above. Chip 600 also includes additional circuitry 112. In this example, the additional circuitry may include input diode 208, pull-down circuitry 230, pull-up circuitry 242, and transistor M1 244. These components help to provide zero current detection and protection for a boost converter as described herein. In other examples, the additional circuitry 112 may vary from the examples described herein. Also, the sizes and values of the components, voltages, and currents may differ in other examples.

Chip 600 also includes an input pin 114, an LX pin 116, and a BOOST pin 118. In one example, the input pin 114 is coupled to a voltage source such as voltage source $V_{IN}$ 120. LX pin 116 may be coupled to the components that are coupled to LX node 116 shown in FIGS. 1-4. BOOST pin 118 may be coupled to the components that are coupled to BOOST node 118 shown in FIGS. 1-4. Some of the components shown in FIGS. 1-4 may be located outside of chip 600.

Figure 7:
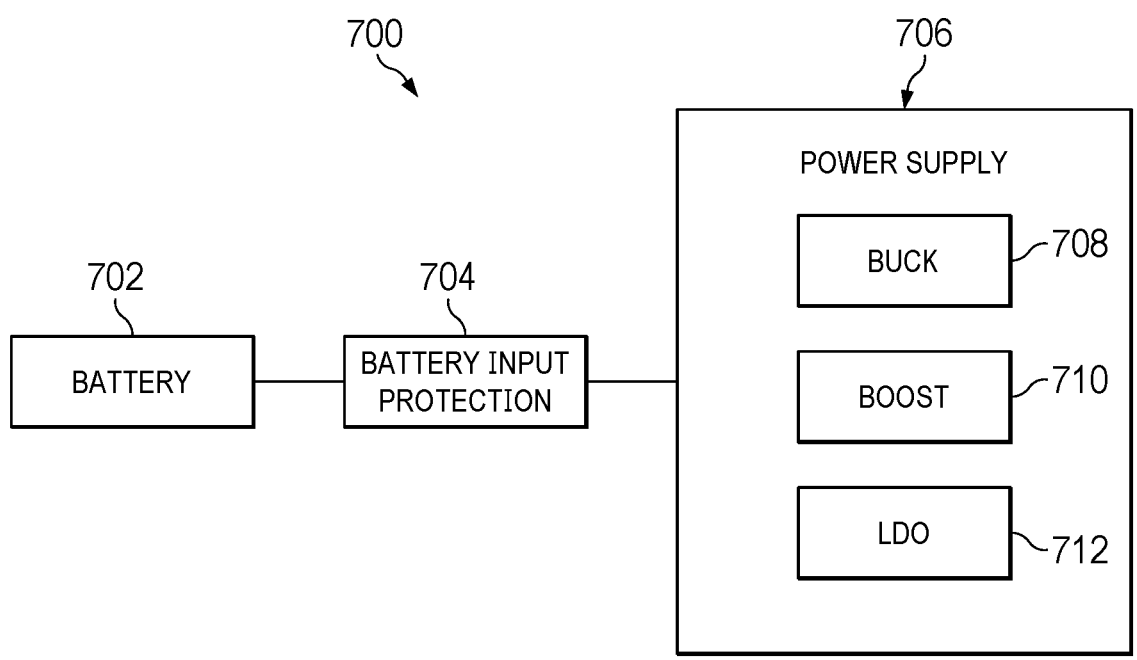
FIG. 7 is block diagram of a system for zero current detection and protection for a DCM boost converter in various examples.

FIG. 7 is a block diagram of a system 700 for zero current detection and protection for a DCM boost converter in various examples herein. System 700 may be a power protection system with a boost converter in one example. In some examples, system 700 may be an automotive power product.

System 700 includes a battery 702, battery input protection 704, and a power supply 706. Power supply 706 may include one or more buck converters 708, one or more boost converters 710, and one or more low drop-out (LDO) regulators 712. The components described above with respect to FIGS. 1-4 and 6 may be found in battery input protection 704 and/or in power supply 706. In one example, system 700 may include components of an electronic control unit (ECU).

Low quiescent current (IQ), always-on, battery-supplied automotive products may contain the examples described herein. KL30 may refer to products supplied by a battery, and automotive power products supplied by a battery may include the examples described herein. The CISPR (International Special Committee on Radio Interference) standard sets standards for electromagnetic interference in electrical and electronic devices. Products that comply with KL30 and a standard such as CISPR. 25 may include the examples described herein. The examples described herein provide high output driving capability for a variety of applications. For example, an advanced driver assistance system (ADAS) that includes cameras, radar, sensors, and controllers may include the examples herein. Body electronics and lighting may contain the examples described herein. These applications may include body motors, body control modules, temperature control and heating, lighting and seat control, car security, and auxiliary power. Hybrid powertrain and electronic vehicles may contain the examples described herein. These may include powertrain, sensors, engine management, and battery management systems. Instrument clusters, automotive displays, and head units may also contain the examples described herein.

In other boost architectures, DCM mode may include a minimum off time to ensure the current through the boost inductor reaches zero before the next switch turn-on pulse. However, this minimum off time reduces output delivery power for the inductor. The examples described herein therefore provide more output power for a given inductor by eliminating the minimum off time.

The examples herein provide a low-IQ, ZCD biasing, and high-voltage protection scheme for a CISPR 25 compliant DCM boost converter. With a ZCD, a high minimum off time is removed. In this example, a single transistor, such as transistor M1 244, creates comparator offset in an on cycle and high voltage isolation in an off cycle. The high current needed for fast turn-on of transistor M1244 is modulated with the boost duty cycle to produce a negligible steady state IQ. The examples described herein also help to prevent external component and parasitic dependent LC ringing in the boost converter at each pulse if the inductor current reaches 0 A or another small amount of current.

In examples herein, the circuitry may have a low IQ (~52 nA) and a fast response time (~2 ns) despite having blocking capability for high voltages, such as 85 V. The examples may be compliant with CISPR 25 EMI limits without including a noise filter. Also, the elimination of the minimum off time provides high use of the inductor energy while in DCM.

The example architecture ensures qualification in automotive communication equipment without noise interference. The examples described herein may be advantageous in all low IQ, high speed designs with higher gate drive for a faster turn-on. Also, the architecture described herein is useful in other boost converters because it may provide maximum utilization of the inductor energy and high efficiency in a steady state.

In this description, the term "couple" may cover connections, communications or signal paths that enable a functional relationship consistent with this description. For example, if device A provides a signal to control device B to perform an action, then: (a) in a first example, device A is directly connected to device B; or (b) in a second example, device A is coupled to device B through intervening component C if intervening component C does not alter the functional relationship between device A and device B, so device B is controlled by device A via the control signal provided by device A. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board. As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A system, comprising:
    a differential amplifier having a first input terminal and a second input terminal, the differential amplifier configured to be coupled to a boost diode of a boost converter;
    an input diode coupled to the first input terminal and the second input terminal;
    a pull-up circuit coupled to the input diode and configured to be coupled to the boost diode;
    a pull-down circuit coupled to the pull-up circuit; and
    a transistor coupled to the pull-up circuit and the pull-down circuit.

2. The system of claim 1, wherein the transistor is configured to be coupled to a boost switch and a boost inductor.

3. The system of claim 1, wherein the pull-up circuit includes:
    a resistor and a Zener diode.

4. The system of claim 1, wherein the transistor is a first transistor, and the pull-down circuit includes:
    a resistor and a second transistor.

5. The system of claim 1, wherein the transistor includes a source coupled to the input diode, a gate coupled to the pull-up circuit and coupled to the pull-down circuit, and a drain coupled to a boost switch.

6. The system of claim 1, wherein the transistor is configured to isolate the differential amplifier from a boost switch of the boost converter.

7. A system, comprising:
    a boost converter including a boost inductor, a boost diode, and a boost switch, wherein the boost converter is configured to receive an input voltage and provide a boosted output voltage;
    a differential amplifier having a first input terminal and a second input terminal, the differential amplifier coupled to the boost diode and configured to determine a voltage difference;
    an input diode coupled to the first input terminal and the second input terminal, the input diode configured to provide the voltage difference between the first input terminal and the second input terminal; and
    a transistor coupled to the input diode, the transistor configured to isolate the differential amplifier from the boost switch.

8. The system of claim 7, further comprising:
    a pull-up circuit configured to provide a source-to-gate voltage to turn on and turn off the transistor.

9. The system of claim 7, further comprising:
    a pull-down circuit configured to turn on the transistor.

10. The system of claim 9, wherein the pull-down circuit is configured to turn on the transistor responsive to the boost switch being off.

11. The system of claim 9, wherein the pull-down circuit is configured to turn off the transistor responsive to the boost switch being on.

12. The system of claim 7, wherein the transistor includes a source coupled to the input diode, a gate coupled to a pull-up circuit and a pull-down circuit, and a drain coupled to the boost switch.

13. The system of claim 7, wherein the differential amplifier is configured to detect a level of a current through the boost diode.

14. A system, comprising:
- a boost converter including a boost inductor, a boost diode, and a boost switch, wherein the boost converter also includes:
- a differential amplifier having a first input terminal and a second input terminal, the differential amplifier coupled to the boost diode;
- an input diode coupled to the first input terminal and the second input terminal;
- a pull-up circuit coupled to the input diode;
- a pull-down circuit coupled to the pull-up circuit; and
- a transistor coupled to the pull-up circuit and the pull-down circuit.

15. The system of claim 14, wherein the pull-up circuit includes:
- a resistor and a Zener diode.

16. The system of claim 14, wherein the transistor is a first transistor, and the pull-down circuit includes:
- a resistor and a second transistor.

17. The system of claim 16, further comprising:
- an inverter coupled to the boost switch and the second transistor.

18. The system of claim 14, wherein the transistor includes a source coupled to the input diode, a gate coupled to the pull-up circuit and the pull-down circuit, and a drain coupled to the boost switch.

19. The system of claim 14, wherein the boost diode is coupled to the input diode and the transistor.

20. The system of claim 14, wherein the boost inductor is coupled to the transistor.

* * * * *